May 18, 1965     C. F. BENSON ETAL     3,184,020
OVERRUNNING CLUTCH AND CAGE THEREFOR
Filed March 1, 1962     4 Sheets-Sheet 1

CARL F. BENSON
JOHN H. COWLES
INVENTORS

BY Mason, Porter, Miller & Stewart

ATTORNEYS

May 18, 1965  C. F. BENSON ETAL  3,184,020
OVERRUNNING CLUTCH AND CAGE THEREFOR
Filed March 1, 1962  4 Sheets-Sheet 2

CARL F. BENSON
JOHN H. COWLES
INVENTORS

BY Mason, Porter, Miller & Stewart

ATTORNEYS

CARL F. BENSON
JOHN H. COWLES
INVENTORS

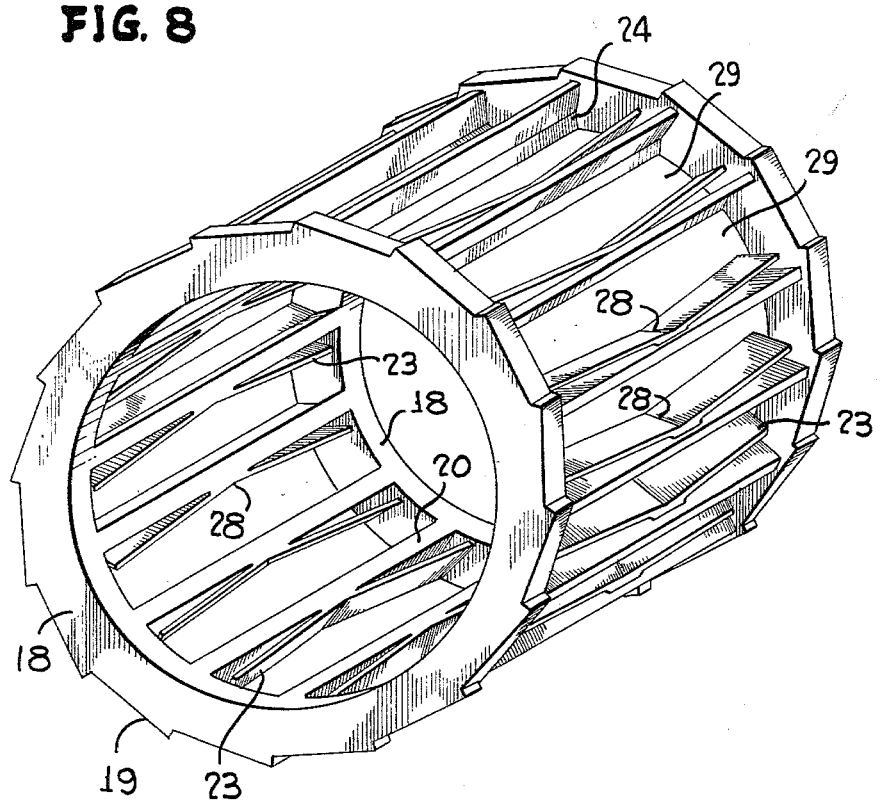

United States Patent Office 3,184,020
Patented May 18, 1965

3,184,020
OVERRUNNING CLUTCH AND CAGE THEREFOR
Carl F. Benson, Torrington, and John H. Cowles, Forestville, Conn., assignors to The Torrington Company, Torrington, Conn.
Filed Mar. 1, 1962, Ser. No. 176,681
6 Claims. (Cl. 192—45)

The specification which follows relates to improvements in the roller type of one-way, or overrunning clutch assemblies, including specifically a thin shell cammed outer member, roller retainment means, and actuating means for the engagement of the rollers with the clutch members.

This type of clutch finds its use in mechanisms requiring a self-engaging clutch when rotative motion is to be transmitted from one member to another in one direction of rotation and which is self-disengaging when the driven member is driven at a higher speed by some external source or the driving member of the clutch loses speed relatively to the driven member or reverses its direction of rotation.

Roller clutches consist in general of an assembly comprising an internal ring, an external ring, and a plurality of rollers between the rings with one of the roller contacting ring surfaces having cam or wedging surfaces for each roller. In addition, some means is used to maintain or cause the rollers to be in contact with both ring surfaces when driving is required through the clutch.

An object of the present improvement in overrunning clutches described herein is to provide a component assembly having the more intricate clutch parts assembled as an economical unit. This unit interposed between cylindrical surfaces of two coaxial members makes an economical, efficient and positive overrunning clutch.

Another object of the invention is to provide a compact, thin radial sectioned roller clutch having roller wedging surfaces in a thin sectioned shell type outer member for the purposes before mentioned.

A further object of the invention is to provide a roller clutch whose outer member derives its resistance to relative rotation between itself and its housing, from friction of the initial press fit between these members and the increased pressure caused by the expansion of the outer member due to the wedging of the rollers between the outer member and the clutch inner member.

A further object of the invention is to provide in one piece an improved combined roller actuating spacer and retainer cage which further reduces the manufacturing costs because the complete cage can be made in one molding operation.

A still further object of the invention is to provide an improved roller clutch having the internally cammed member novelly adapted to enclose the rollers and their actuating retainer concentrically.

These and other objects of the invention will be apparent from the following description and accompanying drawings, in which:

FIG. 8 is an enlarged isometric view of the improved cage for actuating, spacing and retaining the rollers.

Briefly described the novel overrunning roller clutch component unit assembly includes a thin sectional outer shell member generally cylindrical externally having radially projecting ends and a plurality of spaced cam or wedge surfaces formed within its inner surface. Assembled therein is a plurality of rollers held in, positioned, and actuated by an improved roller cage in one piece within the outer member and registered circumferentially with said outer member to contact the wedge surfaces. Said cage has circumferentially spaced roller spacing and retaining bars with individual reed actuating springs for the rollers. This assembly when mounted in a housing bore with a pressure fit to support and round up the outer member shell and combined with a shaft or shaft with an annular ring assembled into the bore or internal diameter under the rollers to contact them, makes a complete, efficient, positive, and economical overrunning clutch.

Figure 1:
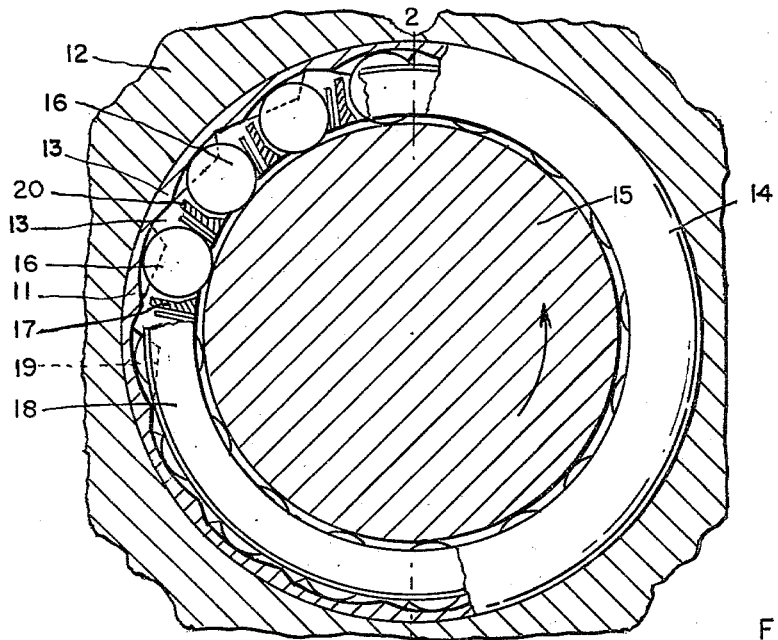
FIG. 1 is a vertical transverse section of one form of the improved roller clutch assembly as installed.
Figure 2:
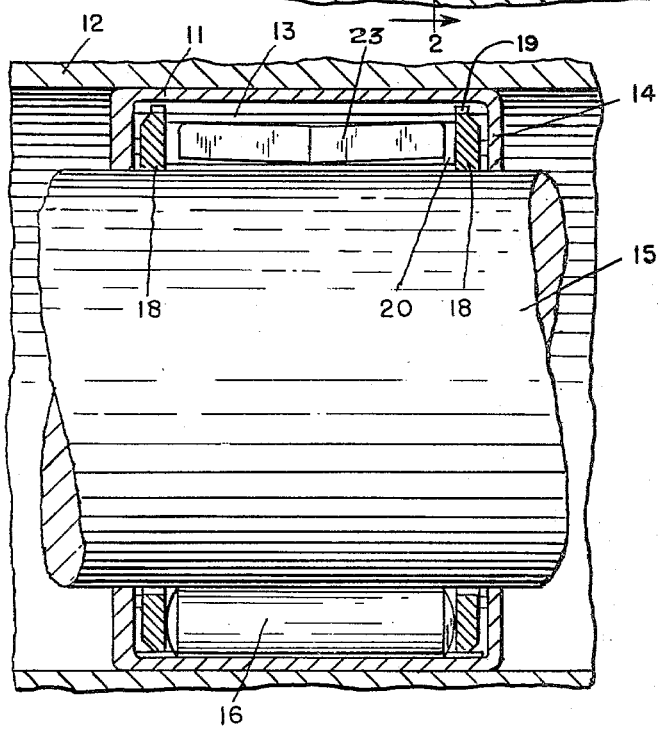
FIG. 2 is a side elevation partly in section of the improved clutch assembly as seen on line 2—2 of FIG. 1.
Figure 3:
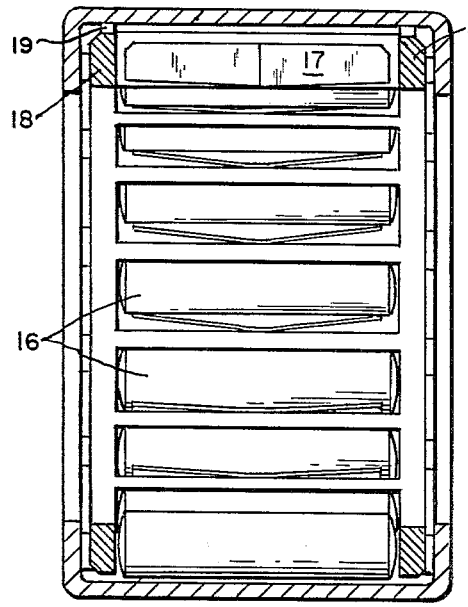
FIG. 3 is a vertical transverse section of the unmounted clutch assembly.

In the form of the invention as illustrated in FIGS. 1, 2 and 3, an outer member 11 in one piece is provided held in a rotatable member 12 which may be a wheel pulley, gear or the like. This thin shell outer member 11 has a generally cylindrical external diameter and a plurality of integral spaced cam, wedge, or ramp toothed projections 13 from and around its internal periphery. The outer member has radial ends 14. Said projections 13 run axially between said radial end flanges 14.

The opposite clutch member is a shaft 15 adapted for driving rotation as shown by the arrow in FIG. 1.

Within the thin shell outer member are shown a plurality of bearing rollers 16. These rollers are generally cylindrical and can have slightly convex or flat ends.

Figure 6:
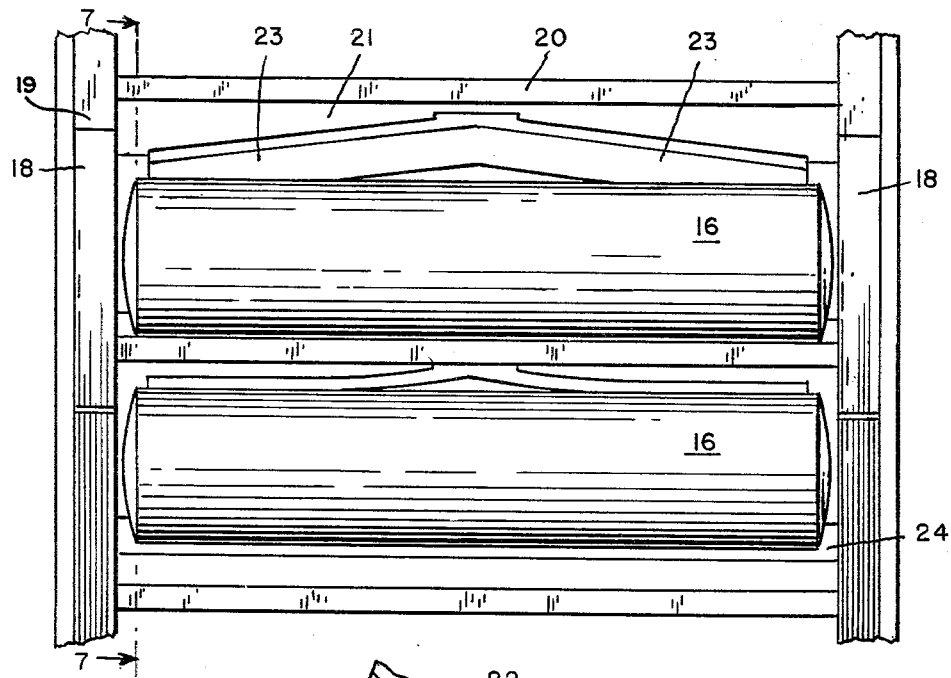
FIG. 6 is an enlarged fragmentary elevation of the improved roller actuator-spacer-retainer cage having rollers with the outer member removed.

The rollers 16 are held in place by means of the one piece actuating cage 17. The actuating cage 17 has annular end rings 18 which are circular at their internal diameter and have a plurality of radially projecting spaced teeth 19 on the external periphery. The end rings 18 are connected by unitary extensions forming narrow resilient bars 20 circumferentially spaced around the rings forming openings 29. The bars 20 generally slightly inclined, extend in a radial direction from the internal diameter of the end rings. The bars have front face 21 and rear face 22 as seen best in FIGS. 6, 7 and 8.

Projecting from the center of the front face 21 of each of the bars 20 for substantially the height of each bar and integral therewith is a thin reed type leaf spring 23. Each spring 23 has a juncture 28 with the bar face 21 from which it projects at a slight angle in opposite directions away from the bar 20 and towards and almost to the inside faces of the end ring 18. On the opposite side of rear face 22 of the bar 20 is another integral projection forming a shelf ledge or step 24 which projects from and along the inside diameter of the bar a short distance merging part way up with the bar face 22 forming a reduced opening. This projection can cover the whole length of bar or merely at two points adjacent the ends of the bars. The reduced opening between said ledge 24 extremity and the substantially deflected spring 23 is less than the roller diameter.

The overrunning roller clutch is assembled by inserting the cage within the outer member having the teeth 19 registered between successive outer member wedge toothed surfaces 13 before the second end 14 is formed. By bending the end 14 the cage is confined loosely between ends 14 within the outer member.

Figure 7:
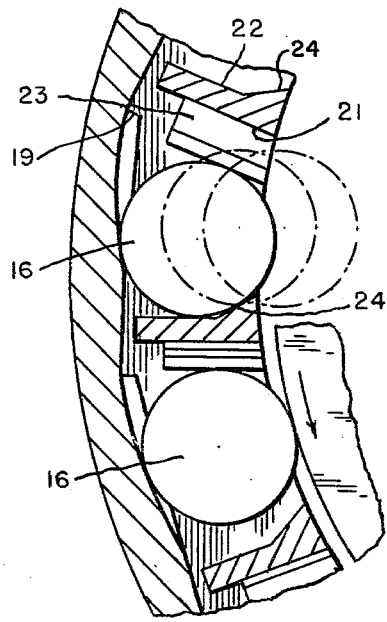
FIG. 7 is an enlarged fragmentary vertical section of the improved roller actuator-spacer-retainer cage with rollers, outer member, and shaft, on the line 7—7 of FIG. 6.

Finally the individual rollers 16 are inserted between adjacent resilient bars 20 and reed or leaf springs 23 by an upward pressure exerted on the rollers. The free ends of the springs act on rollers 16 pushing the rollers against the cam surfaces 13 and adjacent bar side faces 22. The springs 23 are compressed minimally in this position prior to the insertion of the shaft or inner ring in the bore of this assembly. The rollers, as shown in the portion of FIG. 7 with the shaft removed, assume their lowest allowable radial position and in this position have a diameter under the rollers considerably less than the shaft or inner ring intended for use with the assembly. The spring action therefore is to lightly press the rollers against the wedge surface which in turn directs the rollers radially inward.

Figure 4:
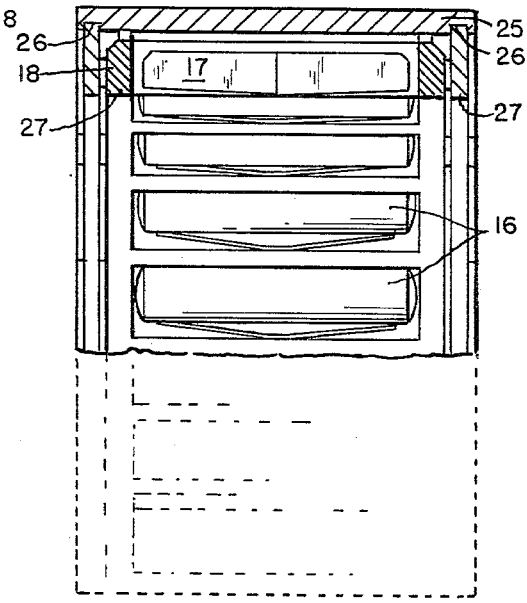
FIG. 4 is a vertical transverse section of a modified form of the unmounted improved clutch assembly.
Figure 5:
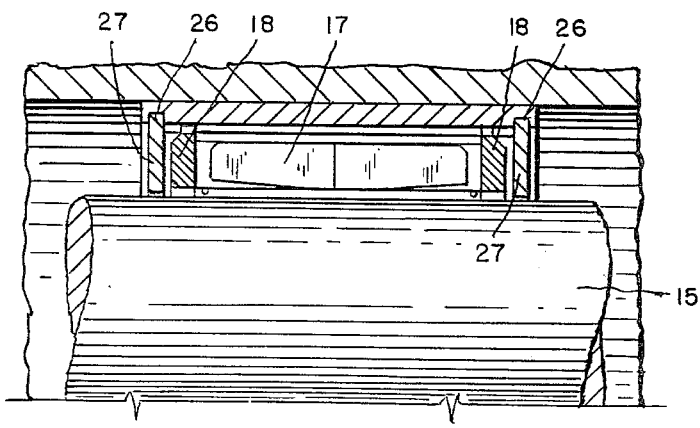
FIG. 5 is an enlarged vertical transverse section of this form of the mounted roller clutch.

A modification of the invention is illustrated in FIG. 4. Here the outer member 25 is made as a sleeve having the same external and internal configuration as the previously described outer member 11. The outer member 25 has annular internal grooves 26, 26 adjacent and externally of the cage end rings 18. Grooves 26 have radial annular retaining rings 27 enclosing but allowing axial movement of cage 17.

It should be understood that the outer member may have one integral radial end and one groove-inserted retaining ring, although not shown here.

The modified overrunning clutch component is assembled by inserting the cage in the same manner as before mentioned with one retaining ring 27 in place. After the cage is in place, the other retaining ring is inserted. Roller assembly is identical.

The invention as described above is now ready to be applied as an assembly component to any mechanism requiring an overrunning clutch. The unit is frictionally fitted between cylindrical surfaces of two coaxial members thusly. The assembly is pressed into a housing 12, as shown in FIG. 7, then a shaft 15 is slid into the opening causing a movement of the rollers 16 which is radially outward and also in a clockwise circumferential direction about a pitch diameter due to the shaft size and slope of the wedge surfaces. The circumferential movement of the rollers further deflects the leaf springs 23 and results in clearance between the rollers and the cage bar rear face 22 as shown in FIG. 7. With this arrangement, the rollers are frictionally in contact with shaft and wedge surfaces of the outer member. Rotation of the shaft 15 in a counterclockwise direction, as shown by arrow, or rotation of the housing in a clockwise direction causes wedging of the rollers between the shaft 15 and wedging surfaces 13 thereby forcing the outer member to rotate in the same direction as the shaft or the shaft to rotate with outer member.

The wedging actions also press the outer member tighter against the housing resulting in more frictional force against relative rotation or slippage occurring between the outer member and housing.

Rotation of the shaft in a clockwise direction releases the wedging pressure between shaft, rollers, and outer cammed member allowing the shaft to slip under the rollers. However, the rollers are still kept in light pressure contact with the wedging and shaft surfaces due to the leaf spring action.

It is understood that numerous changes may be made in minor features of structure, material and proportions within the scope of the invention as defined in the following claims.

What we claim is:

1. An overrunning roller clutch comprising a thin shell outer cylindrical clutch member having a plurality of inwardly sloped wedge shaped cams, a one piece roller cage having end rings, peripheral teeth on said rings engaging the outer clutch member between said cams, spaced longitudinal bars on the cage, a roller retaining step integrally formed on the inner rear edge of each bar, a resilient roller support means on the front face of each bar and a bearing roller in the space between each two adjacent bars.

2. An overrunning roller clutch comprising a thin shell outer cylindrical clutch member having a plurality of inwardly sloped wedge shaped cams, a one piece roller cage having end rings, peripheral teeth on said rings engaging the outer clutch member between said cams, spaced longitudinal bars on the cage, a roller retaining step formed integrally on the inner rear edge of each bar, a resilient integral bifurcated spring mounted at its midpoint centrally on the front face of each bar and a bearing roller in the space between each two adjacent bars.

3. A one piece roller retaining and actuating cage for an overrunning roller clutch comprising end rings having peripheral teeth, spaced longitudinal bars extending between said end rings and integral therewith, an integral roller engaging step on the inner rear edge of each bar and a bifurcated leaf spring mounted at its midpoint centrally on the front face of each bar for engagement with a roller.

4. An overrunning roller clutch comprising a thin shell outer cylindrical clutch member having end flanges and a plurality of inwardly sloping wedge shaped cams, a one piece roller cage having end rings and located within said flanges, peripheral teeth on said rings engaging the outer clutch member between said cams, spaced longitudinal bars on the cage, a roller retaining step on the inner rear edge of each bar, an integral resilient roller support means on the front face of each bar and a bearing roller in the space between each two adjacent bars.

5. An overrunning roller clutch comprising a thin shell outer cylindrical clutch member having a plurality of inwardly sloped wedge shaped cams, a one piece roller cage having end rings, spaced longitudinal bars on the cage, a roller retaining step integrally formed on the inner rear edge of each bar, a leaf spring mounted at its midpoint centrally on the front face of each bar for engagement with a roller and a bearing roller in the space between each spring and the opposite step.

6. A one piece retaining and actuating cage for an overrunning clutch comprising end rings having peripheral teeth, spaced longitudinal bars extending between said end rings and integral therewith, an integral roller supporting step on the inner rear edge of each bar and an integral roller engaging resilient projection on the front face of each bar.

References Cited by the Examiner

UNITED STATES PATENTS

| | | | |
|---|---|---|---|
| 2,843,238 | 7/58 | Rozner | 192—45 |
| 2,973,847 | 3/61 | Stockton | 192—45 |
| 3,011,606 | 12/61 | Ferris et al. | 192—45 |
| 3,012,645 | 12/61 | Gensheimer et al. | 192—45 |
| 3,031,052 | 4/62 | Blinder | 192—45 |
| 3,031,053 | 4/62 | Sauzedde et al. | 192—45 |
| 3,087,588 | 4/63 | Fischer | 192—45 |
| 3,095,954 | 7/63 | Ferris | 192—45 |

DAVID J. WILLIAMOWSKY, *Primary Examiner.*

THOMAS J. HICKEY, *Examiner.*